(12) United States Patent
Puphal et al.

(10) Patent No.: US 12,252,119 B2
(45) Date of Patent: Mar. 18, 2025

(54) DRIVER ASSISTANCE SYSTEM AND VEHICLE INCLUDING THE DRIVER ASSISTANCE SYSTEM BASED ON DETERMINING A PERCEIVED SITUATION FROM MULTIPLE POSSIBLE SITUATIONS

(71) Applicant: Honda Research Institute Europe GmbH, Offenbach/Main (DE)

(72) Inventors: Tim Puphal, Offenbach (DE); Malte Probst, Offenbach (DE); Raphael Wenzel, Offenbach (DE)

(73) Assignee: Honda Research Institute Europe GmbH, Offenbach/Main (DE)

( * ) Notice: Subject to any disclaimer, the term of this patent is extended or adjusted under 35 U.S.C. 154(b) by 239 days.

(21) Appl. No.: 18/190,932

(22) Filed: Mar. 27, 2023

(65) Prior Publication Data
US 2024/0326793 A1  Oct. 3, 2024

(51) Int. Cl.
*B60W 30/095* (2012.01)
*B60W 30/09* (2012.01)
*B60W 50/14* (2020.01)

(52) U.S. Cl.
CPC ........ *B60W 30/0956* (2013.01); *B60W 30/09* (2013.01); *B60W 50/14* (2013.01);
(Continued)

(58) Field of Classification Search
CPC .. B60W 30/0956; B60W 30/09; B60W 50/14; B60W 2554/4046;
(Continued)

(56) References Cited

U.S. PATENT DOCUMENTS 8,989,998 B2  3/2015  Le et al.
9,165,477 B2  10/2015  Wilson
(Continued)

FOREIGN PATENT DOCUMENTS

DE   112014001436   1/2016
WO   2021128266    7/2021
(Continued)

OTHER PUBLICATIONS

Junbo et al., "Learning to Represent and Generalize Lateral Control Deviation Based on Driving Data," 2020, Publisher: IEEE.*
(Continued)

*Primary Examiner* — Tuan C To
(74) *Attorney, Agent, or Firm* — JCIPRNET

(57) ABSTRACT

A computer-implemented method comprises sensing an environment of the ego-agent that includes at least one other agent. The method predicts possible behaviors of the at least one other agent based on the sensed environment, and plans trajectories of the ego-agent for each possible behavior of the at least one other agent to generate a set of planned trajectories. The method proceeds with determining an actual trajectory of the ego-agent, and comparing the determined actual trajectory of the ego-agent with each of the planned trajectories of the ego-agent and determining a planned trajectory with a largest similarity to the actual trajectory of the ego-agent. Subsequently, a perceived situation as perceived by the ego-agent based on a particular predicted possible behavior of the predicted possible behaviors corresponding to the planned trajectory with the largest similarity is determined. The method executes an action in an assistance system based on the determined perceived situation.

18 Claims, 8 Drawing Sheets

(52) U.S. Cl.
CPC . *B60W 2050/143* (2013.01); *B60W 2050/146* (2013.01); *B60W 2554/4046* (2020.02)

(58) Field of Classification Search
CPC ...... B60W 2050/143; B60W 2050/146; G08G 1/00; G08G 1/16; G08G 1/165; G05D 1/622; B60Q 9/00; B60Q 9/002
USPC .......................................................... 701/301
See application file for complete search history.

(56) References Cited

U.S. PATENT DOCUMENTS

| | | | |
|---|---|---|---|
| 9,463,797 | B2 | 10/2016 | Damerow et al. |
| 9,666,084 | B2 | 5/2017 | Shapiro et al. |
| 10,220,841 | B2 | 3/2019 | Sendhoff et al. |
| 10,627,812 | B2 | 4/2020 | Eggert et al. |
| 11,292,458 | B2 | 4/2022 | Urano et al. |
| 2005/0110348 | A1 | 5/2005 | Hijikata et al. |
| 2008/0195281 | A1 | 8/2008 | Norris et al. |
| 2020/0231149 | A1 | 7/2020 | Eggert et al. |
| 2020/0269867 | A1 | 8/2020 | Hua et al. |
| 2021/0009163 | A1* | 1/2021 | Urtasun ............... G08G 1/0133 |
| 2021/0200230 | A1* | 7/2021 | Ross ..................... G05D 1/0088 |
| 2021/0394794 | A1* | 12/2021 | Gyllenhammar ..... B60W 40/10 |
| 2022/0161811 | A1* | 5/2022 | Lu ..................... B60W 60/0053 |
| 2022/0188667 | A1* | 6/2022 | Burisch .................. G08G 1/166 |
| 2024/0174264 | A1* | 5/2024 | Wray .................. B60W 60/001 |

FOREIGN PATENT DOCUMENTS

| | | | | |
|---|---|---|---|---|
| WO | WO-2023017090 | A1 * | 2/2023 | .......... G06F 11/3688 |
| WO | WO-2023021208 | A1 * | 2/2023 | ............ B60W 50/00 |

OTHER PUBLICATIONS

Wei-Jen et al., "Optimal Trajectory Planning with Dynamic Constraints for Autonomous Vehicle," 2019, Publisher: IEEE.*

* cited by examiner

DRIVER ASSISTANCE SYSTEM AND VEHICLE INCLUDING THE DRIVER ASSISTANCE SYSTEM BASED ON DETERMINING A PERCEIVED SITUATION FROM MULTIPLE POSSIBLE SITUATIONS

TECHNICAL FIELD

The invention relates to the field of assistance systems for assisting operations of an ego-agent. In particular, a method for an automotive driver assistance system with a capability to determine a perceived situation, a corresponding driver assistance system, and a vehicle including the driver assistance system are proposed.

BACKGROUND

Assistance systems that assist in operating an ego-agent may include as a prominent example driving assistance systems that support or even autonomously operate a vehicle (ego-vehicle) in a road traffic environment. The assistance system acquires sensor data from a plurality of sensors including, but not limited to, sensors mounted on the ego-vehicle, generates a representation of the current situation in the environment of the ego-vehicle, and classifies the current driving situation. The assistance system recommends to a human driver of the ego-vehicle a behavior how to proceed in the current situation, or even executes autonomously the behavior deemed suitable to cope with the current situation.

The assistance system thereby has to decide on a sequence of maneuvers of the ego-agent in the current situation. The sequence of maneuvers determines a trajectory of the ego-agent in the environment. Increased computational resources available enable to design assistance systems, which are able to cope with ever more complex situations in the traffic environment. Assistance systems evolve from performing adaptive cruise control (ACC) functions over lane-change assistance functions, providing assistance at intersections, to providing an increasing level of autonomy in operating the ego-vehicle.

In particular, an urban traffic environment poses a significant challenge to assistance systems due to the dense and complex environment including a plurality of agents including the ego-agent and most probably a plurality of other agents, often of different types with widely differing capabilities and characteristics, e.g. cars, trucks, motorcycles, bicycles, pedestrians, animals. There exists a plurality of risks, e.g. collision risks between the ego-agent and the other agents or static objects, curvatures of trajectories and lanes or roads. Another source of risks stem from regulations, e.g. rules of precedence at intersections, traffic lights, traffic signs, speed limits. The urban environment will mostly include a plurality of elements including all or a subset of the cited elements simultaneously adding to its complexity, and is characterized by its highly dynamic evolvement starting from a sensed current situation. The dynamic evolvement of the traffic situation requires a constantly updated situation aware planning by the assistance system.

Typically, planning a behavior and a trajectory involves various levels. The planning levels may include an emergency level, which requires imminent and fast reaction to the current situation in the environment, e.g. in order to mitigate a collision risk.

A mid-term planning level regards gradual changes in velocities and lateral positions of the agents present in the environment. The mid-term planning has its focus on how to act starting from the current situation.

A long-term planning level regards the different outcome and evolvement of the current situation depending on a decision of the ego-agent, e.g. what to do in the current situation.

In particular, the mid-term planning level and the long-term planning level concern longer planning horizons in time, and include and have to regard an increased number of interdependencies between agents, interactions between agents and between potential behaviors of the agents all influencing the decisions of each involved agent.

U.S. Pat. No. 9,165,477 B2 discloses a method for building road models, vehicle models and driver models and for making predictions from the built road models, vehicle models and driver models based on a map that is built from observations of driver behaviors. The method includes comparing the learned driving model with actual human driving. For generating the predictions, the method disclosed in U.S. Pat. No. 9,165,477 B2 relies on a driving database. Interactions of an ego-vehicle with other vehicles in the driving scenario are not considered in U.S. Pat. No. 9,165,477 B2. However, for behavior planning, the interaction of the ego-agent with the other agents within the planning horizon represents an influential factor how the current traffic scenario will evolve. A perception of the current situation of the current environment including other agents and their presumed intentions as perceived by the ego-agent will influence the decision making of the ego-agent, which actions to perform in order to take the current situation and a predicted evolvement into account. The human perception of the current situation including one or even plural other agents in the environment, and possibly including misconceptions of the future evolvement may adversely affect the future evolvement of the current situation, thereby creating potential safety issues and increasing risk.

SUMMARY

Therefore, it is an object of the invention to provide an improved assistance system overcoming the safety issue discussed before. It is in particular an object of the invention to provide an assistance system with capability to identify driving mistakes and even to support identifying underlying reasons for identified driving mistakes.

In a first aspect, the method according to independent claim 1 solves the aforementioned problem. The program according to a second aspect, the assistance system according to a third aspect, and the vehicle according to a fourth aspect provide further advantageous solutions to the problem.

In the first aspect, the computer-implemented method in an assistance system for determining a perceived situation perceived by an ego-agent, comprises a step of sensing an environment of the ego-agent that includes at least one other agent; the method further comprises steps of predicting possible behaviors of the at least one other agent based on the sensed environment, of planning trajectories of the ego-agent for each possible behavior of the at least one other agent to generate a set of planned trajectories, and of determining an actual trajectory of the ego-agent. The method proceeds with a step of comparing the determined actual trajectory of the ego-agent with each of the planned trajectories of the ego-agent and determining a planned trajectory with a largest similarity to the actual trajectory of the ego-agent. Subsequently, the method determines a perceived situation as perceived by the ego-agent based on a particular predicted possible behavior of the predicted possible behaviors corresponding to the planned trajectory with the largest similarity, and executes an action in the assistance system based on the determined perceived situation.

The method according to the first aspect predicts possible situations for an interaction of the ego-agent and other agents, and plans safe behaviors for the ego-agent for each of the predicted possible situations. The method observes as actually driven trajectory that the ego-agent performs and compares the observed driven trajectory with the trajectories of the planned behaviors for the ego-agent. If the perceived situation and an induced risk deviates from an actual situation, the method causes an action of the assistance system based on the determined perceived situation, in particular based on the determined deviation of the perceived risk from the actual risk.

The action may include warning the assisted person of the wrongly, or at least insufficiently perceived risk.

Alternatively or additionally, the action may include determining a perception error of the assisted person based on the determined deviation, and to highlight the determined perception error in a suitable output to the assisted person.

The computer-implemented method enables finding perceived risks based on the comparison of the planned behaviors for possible situations with the actually executed behavior. Thus, the method determines how the ego-agent predicts the behavior of the other agents in the environment. The method relates the observed own behavior of the ego-agent to the predicted behaviors of the other agents. The observed own behavior of the ego-agent includes an action and a reaction to the perceived behavior and the predicted behavior of the other agents from the perspective of the ego-agent.

The dependent claims define further advantageous embodiments of the invention.

A non-transitory computer-readable storage medium according to the second aspect embodies a program of machine-readable instructions executable by a digital processing apparatus, which cause the digital processing apparatus to perform operations according to one of the embodiments of the method according to the first aspect.

The program according to the second aspect includes program-code means for executing the steps according to one of the embodiments of the method according to the first aspect, when the program is executed on a computer or digital signal processor.

According to the second aspect, a non-transitory computer-readable storage medium embodies a program of machine-readable instructions executable by a digital processing apparatus, which cause the digital processing apparatus to perform operations according to one of the embodiments of the method according to the first aspect.

The assistance system according to the third aspect is adapted to determine a perceived situation as perceived by an ego-agent in an assistance system, the assistance system comprises sensors configured to sense an environment of the ego-agent that includes at least one other agent, and a processor. The processor is configured to predict possible behaviors of the at least one other agent based on the sensed environment, and to plan trajectories of the ego-agent for each possible behavior of the at least one other agent to generate a set of planned trajectories. The processor is further configured to determine an actual trajectory of the ego-agent, and to compare the determined actual trajectory of the ego-agent with each of the planned trajectories of the ego-agent and determining a planned trajectory with a largest similarity to the actual trajectory of the ego-agent. The processor is further configured to determine a perceived situation as perceived by the ego-agent based on a particular predicted possible behavior of the predicted possible behaviors corresponding to the planned trajectory with the largest similarity, and to generate and to output a control signal based on the determined perceived situation to the assistance system for controlling at least one actuator or a human-machine interface configured to execute an action based on the determined perceived situation.

The vehicle according to the fourth aspect includes an assistance system according to one of the embodiments according to the third aspect.

BRIEF DESCRIPTION OF THE DRAWINGS

The description of embodiments refers to the enclosed figures, in which.

In the figures, corresponding elements have the same reference signs. The discussion of same reference signs in different figures is omitted where possible without adversely affecting comprehensibility.

DETAILED DESCRIPTION

Figure 1:
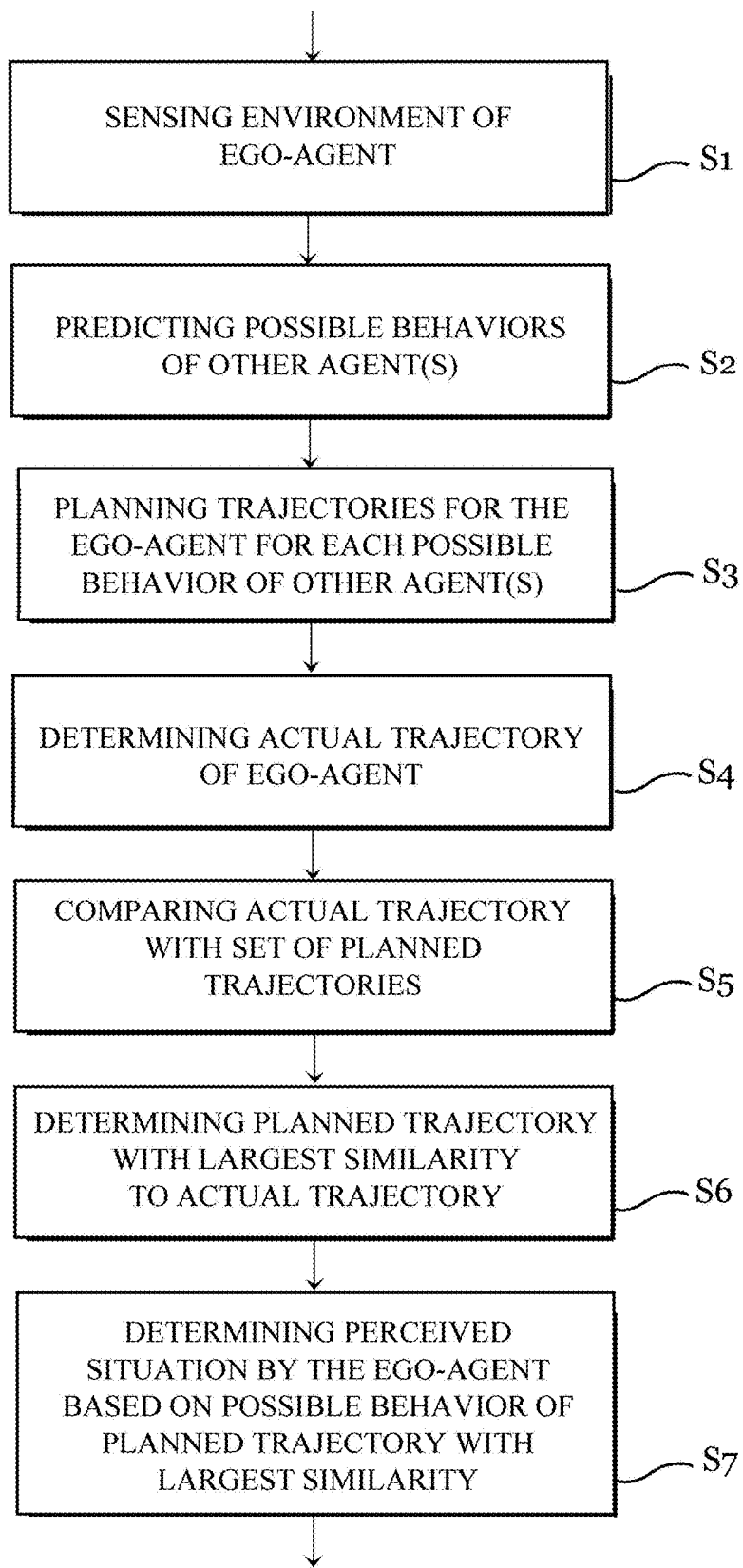
FIG. 1 shows a simplified flowchart of a method according to an embodiment.

The method according to the first aspect provides an advantageous solution to the aforementioned problem. The program according to a second aspect, the assistance system according to a third aspect, and the vehicle according to a fourth aspect provide further advantageous solutions to the problem. The dependent claims define further advantageous embodiments of the invention.

The method according to an embodiment comprises in the step of planning the trajectories, a step of planning the trajectories of the ego-agent for each combination of a behavior of the ego-agent with each of the behaviors of the at least one other agent.

According to an embodiment of the method, a risk value used in the step of planning the trajectories, corresponding to the planned trajectory with the highest similarity to the actual trajectory is a perceived risk value.

The method according to an embodiment comprises in the step of planning the trajectories, predicting the trajectories, by a path prediction module, based on a process for kinematic expansion.

According to an embodiment of the method, in the step of predicting the possible behaviors of the at least one other agent, the method comprises predicting the planned trajectories, by a prediction model of the assistance system, by approximating a perceived behavior of the at least one other agent based on the sensed environment.

The method according to an embodiment comprises in the step of planning the trajectories of the ego-agent, a step of planning, by a planning model of the assistance system, to determine for each possible behavior of the at least one other agent, an optimal plan for the ego-agent, wherein the optimal plan is optimized with respect to at least one of the criteria of a safe plan, an efficient plan and a comfortable plan, and planning the trajectories of the ego-agent based on the determined optimal plan.

According to an embodiment of the method, the assistance system is a road traffic driving assistance system that includes at least one of a lane change assistant, a cruise control system, an intersection assistant.

The method according to one embodiment further comprises determining a perceived risk value based on the perceived situation, and determining a risk perception error of the ego-agent based on a difference between the perceived behavior of the at least one other agent and an actual behavior of the at least one other agent.

According to an embodiment of the method, the method further comprises determining whether to generate a warning signal configured to warn on the determined risk perception error and outputting the generated warning signal to the assistance system.

The method according to an embodiment determines to generate and output the warning signal in case of a difference between the perceived risk and the actual risk exceeding a threshold.

According to an embodiment of the method, the method outputs the warning signal including an indication of the risk perception error to an operator of the ego-agent.

The method according to an embodiment has the risk perception error including at least one of a trajectory prediction error, a dynamics estimation error, and an entity perception error.

The program according to the second aspect, the assistance system according to a third aspect, and the vehicle according to a fourth aspect provide corresponding advantageous solutions as discussed with regard to the embodiments of the method according to the first aspect.

The vehicle may be at least one of a road vehicle, a maritime vehicle, an air vehicle, a space vehicle, an autonomously operating vehicle, and a micromobility vehicle.

The term micromobility vehicle refers to a range of lightweight vehicles of small dimensions and operating velocities typically of 25 km per hour or less. Micromobility vehicles may be driven by their users personally and include bicycles, e-bikes, electric scooters, electric skateboards, and electric pedal-assisted bicycles (pedelecs). The definition of micromobility vehicles (micromobility devices) may include devices with a gross vehicle weight below 500 kg and maximum velocities below or including 45 km/h, and exclude devices with internal combustion engines.

The assistance system according to one aspect may be included in a portable device including a human-machine interface and carried by a user. The assistance system is configured to assist the user by outputting a perceivable signal via the human-machine interface to the user based on the generated control signal.

FIG. 1 shows a simplified flowchart of a method according to an embodiment.

The computer-implemented method is tailored for use in an assistance system for determining a perceived situation perceived by an ego-agent 1. The ego-agent 1 may in particular be a road vehicle moving in a traffic environment, in which at least one, regularly a plurality of other agents is present, in particular moving. The other agents may include other traffic participants, e.g. pedestrians, cyclists, cars, trucks, buses, and tramways.

The assistance system may assist a human operator (driver) of the ego-agent 1 (ego-vehicle), e.g. by recommending actions or issuing alerts and warning signals determined to be suitable in the traffic scenario in the environment of the ego-agent 1.

Alternatively or additionally, the assistance system is configured to at least partially autonomously operate the ego-agent 1, e.g. by executing actions determined to be suitable in the traffic scenario in the environment of the ego-agent 1. The actions may include performing lateral or longitudinal control of movement of the ego-agent 1 in the environment. In particular, the actions may include accelerating or decelerating the ego-agent 1, maintaining a current velocity of the ego-agent 1, amending a steering angle of the ego-agent 1 using at least one actuator, e.g., driving means such as a motor, brakes, or a steering assembly of the ego-agent 1.

The method comprises a step S1 of sensing the environment of the ego-agent 1. In the sensed environment, at least one other agent 2 is present. The ego agent 1 comprises at least one sensor, which acquires sensor data from the environment of the ego-agent 1 and generates sensor data for further processing in processing equipment including at least one processor arranged at least one of locally of the ego-agent 1, or remotely in server installations.

The subsequent steps S2 to S7 are essentially processing steps performed by the processor and performed based on the sensor data provided by the at least one sensor in the sensor signal.

The method proceeds with step S2 that includes predicting possible behaviors of the at least one other agent 2 based on the sensed environment, in particular based on the sensor signal acquired from the at least one sensor.

In step S3, the method proceeds with planning trajectories of the ego-agent 1 for each possible behavior of the at least one other agent 2 to generate a set of planned trajectories. Each planned trajectory included in the set of planned trajectories corresponds to a behavior option for the ego-agent 1 and a predicted behavior of the at least one other agent 2.

In step S4, the method determines an actual trajectory of the ego-agent 1. The method determines the actual trajectory of the ego-agent 1 based on the sensor signal acquired from the at least one sensor via the sensor signal.

The at least one processor may perform steps S2, S3 on the one hand and step S4 on the other hand either sequentially, or at least partially in parallel.

In step S5 succeeding to step S3 and step S4, method proceeds with a step of comparing the determined actual trajectory of the ego-agent 1 with each of the planned trajectories of the ego-agent 1.

In step S6, the method determines a planned trajectory from the set of planned trajectories with a largest similarity to the actual trajectory of the ego-agent 1. The planned trajectory with the largest similarity to the actual trajectory of the ego-agent 1 may be determined as the particular planned trajectory included in the set of trajectories that runs closest in the environment in time and space with the actual trajectory.

The method may include calculating a similarity measure for the actual trajectory and each of the planned trajectories and determine the planned trajectory with the largest similarity as the planned trajectory, which corresponds to the highest calculated similarity measure.

Subsequently, the method proceeds to step S7 and determines a perceived situation as perceived by the ego-agent 1 in the current situation in the environment based on a particular predicted possible behavior of the predicted possible behaviors corresponding to the planned trajectory with the largest similarity.

In step S8, the assistance system executes an action based on a generated and output control signal, or a sequence of actions in the assistance system based on the determined perceived situation as perceived by the ego-agent 1.

The action triggered by the control signal may include generating a warning and providing the warning to the operator of the ego-agent 1 via a human-machine interface of the assistance system in order to make him aware of a wrong perception of the situation in the environment of the ego-vehicle 1.

A wrong perception of the driver can result from perception errors of the ego-agent 1. A wrong perception of the ego-agent 1, e.g. a human driver, can result from wrong assumed predictions. Wrong assumed predictions may include a wrong trajectory prediction, such as predicting that the at least one other agent 2 will make a lane change but that the other agent 2 actually intends to stay on its current lane.

A wrong perception of the ego-agent 1 can result from a wrong assumed dynamics estimation. Wrong assumed dynamics estimations may include, e.g., a wrong current position or a wrong current velocity estimation of the ego-agent 1, in particular the driver of the ego-agent 1, e.g., assuming the other agent 2 is driving faster than the other agent 2 is actually driving.

Perception errors may include not being aware of the presence of the other agent 2 in the environment of the ego-agent 1, or not considering another agent 2, although the other agent 2 is actually present in the environment of the ego-agent 1.

Figure 2:
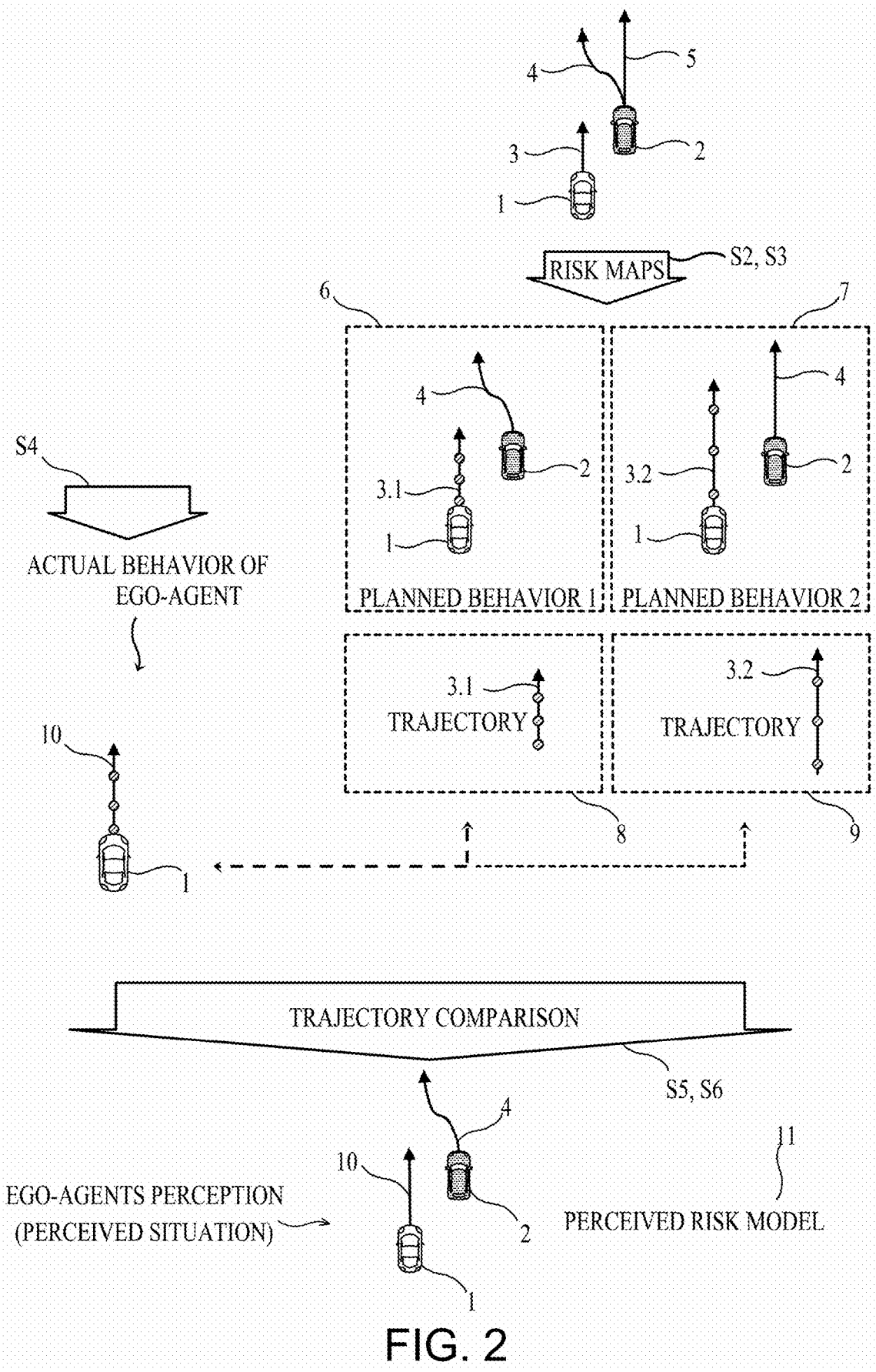
FIG. 2 provides a first schematic functional overview over the method according to an embodiment.

FIG. 2 provides a first schematic functional overview further illustrating the method according to an embodiment.

The environment includes a section of a road with two lanes for traffic into a same direction. The traffic situation in the environment of the ego-agent 1 (ego-vehicle) includes one other agent 2 (other vehicle) that is driving on a right lane with a first velocity. The ego-agent 1 moves on the left lane with a second velocity larger than the first velocity on a trajectory 3 (ego trajectory). The ego-agent 1 is approaching the other agent 2 from behind. Predicting a further evolution of the current traffic situation provides different possible evolvements of the traffic situation.

In a first predicted evolvement of the current traffic situation, the other vehicle 2 changes to the left lane, e.g. due to another vehicle not shown cruising with a low velocity on the right lane ahead of the other vehicle 2 or intending to make a left turn at a next intersection. FIG. 2 shows this possible evolvement of the traffic situation for the other agent 2 proceeding on a first trajectory 4 and cutting in ahead of the ego-agent 1 on the left lane.

In a second predicted evolvement of the current traffic situation, the other vehicle 2 may continue driving on the right lane, thereby proceeding on a second trajectory 5.

Executing steps S2 and S3 of the method according to an embodiment determines alternative behaviors (behavior options) for the ego-agent 1 based on the sensed situation in the environment. FIG. 2 shows two planned behaviors for the ego-agent 1 as examples. The steps S2 and S3 may be performed using a cooperative behavior planning process, e.g. using a behavior-planning tool such as risk maps discussed with reference to FIGS. 8 and 9.

A first behavior option 6 predicts the other agent 2 to proceed on the trajectory 4 and to cut in in front of the ego-agent 1. The first behavior option 6 includes a trajectory 3.1 of the ego agent 1 with a reduced (first) velocity of the ego-agent 1 in order to avoid a collision between the ego-agent 1 and the other agent 2 changing to the lane of the ego-agent 1 directly in front of the ego-agent 1.

A second behavior option 7 predicts the other agent 2 to proceed on the trajectory 5 and to continue driving on the right lane. The second behavior option 7 includes a trajectory 3.2 of the ego-agent with an increased (first) velocity of the ego-agent 1 in order to pass the other agent 2 as early as possible, for example with the intention to enable the other agent 2 changing to the lane of the ego-agent 1 after being passed by the ego-agent 1.

The illustrated set of planned trajectories for the ego-agent 1 in FIG. 2 includes a first planned trajectory 8 corresponding to the first behavior option 6 and a second planned trajectory 9 corresponding to the second behavior option 7.

The method determines in step S4 an actual behavior of the ego-agent 1. Determining an actual behavior of the ego-agent 1 includes determining an actual trajectory 10 of the ego-agent 1.

The steps S5 and S6 of the method compares the actual trajectory 10 driven by the ego-vehicle 1 with each of the planned trajectories included in the set of planned trajectories. The comparison of the actual trajectory 10 and each of the planned trajectories 8, 9 may include comparing predicted locations of the ego-vehicle 1 on the actual trajectory 10 and each of the planned trajectories 8, 9 for the same point in time during a planning horizon. FIG. 2 illustrates a pointwise comparison by showing three locations of the ego-vehicle 1 for corresponding point in times in each of the trajectories 8, 9, 10.

The illustrated example of FIG. 2 shows a reasonable similarity between the actually driven trajectory 10 and the planned trajectory 8. Thus, performing step S7, the method determines based on the determined similarity of the actual trajectory 10 and the planned trajectory 8 that the ego-agent 1 executes the first planned behavior 6. The first planned behavior 6 represents the perception of the ego-agent 1 of the current situation and the presumed evolvement of the current traffic situation in the environment of the ego-agent.

Additionally, using a cooperative behavior planning process, e.g. the behavior-planning tool risk maps, comparing the actual trajectory 10 and the planned trajectory 8 enables to determine a perceived risk value describing a risk as perceived by a user in the current situation and the presumed evolvement of the current traffic situation in the environment from the point of view of the ego-agent 1.

Figure 3:
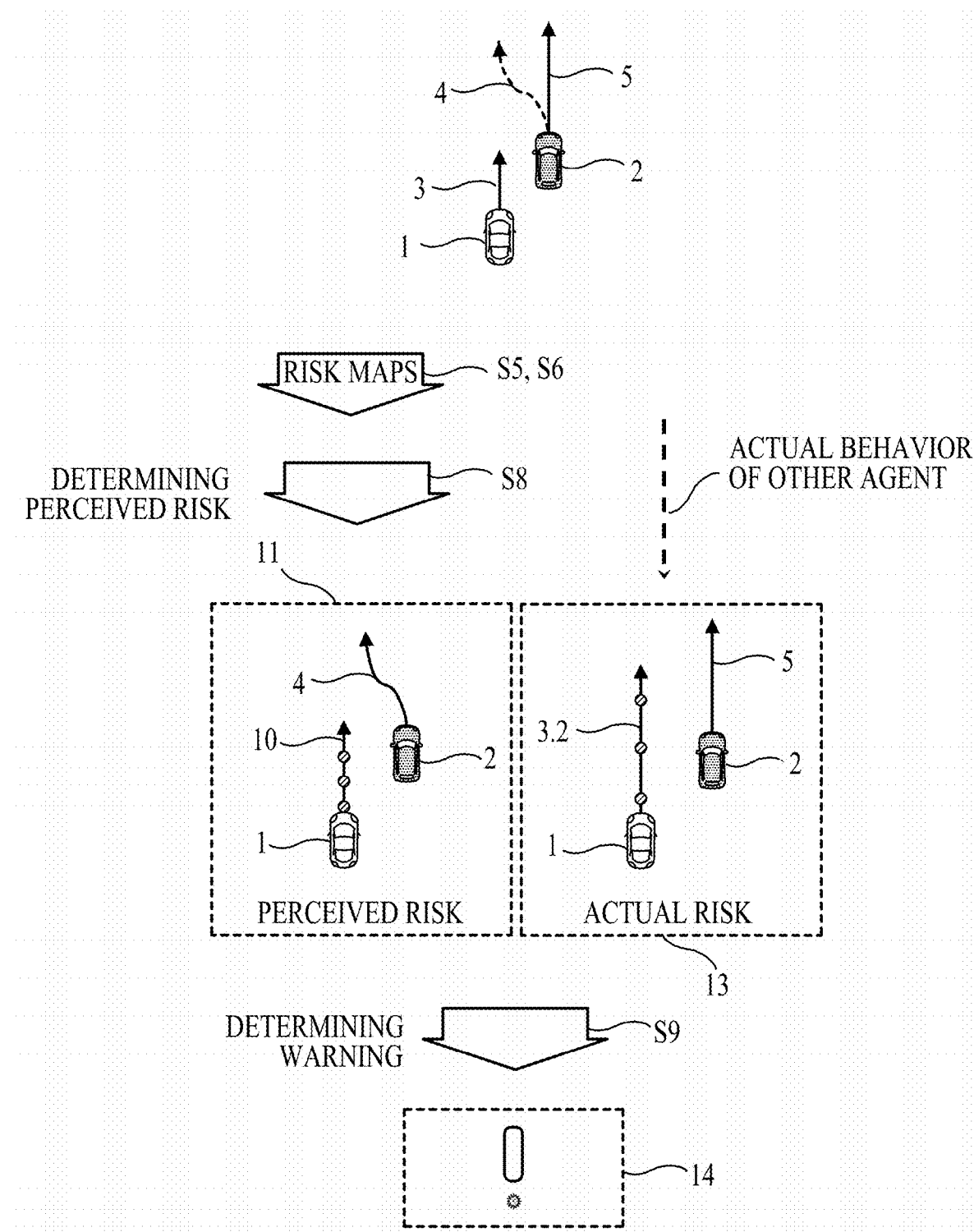
FIG. 3 provides a second schematic functional overview over the method according to an embodiment.

FIG. 3 provides a second schematic functional overview over the method according to an embodiment.

The environment and the traffic situation in the environment of the ego-agent bases on the environment and the situation of FIG. 1. The environment includes the section of the road with two lanes for traffic into the same direction. The traffic situation in the environment includes the ego-agent 1 moving on the left lane on the ego trajectory 3, and one other agent 2 driving on the right lane. Predicting a further evolvement of the current traffic situation provides different possible evolvements of the traffic situation as discussed with reference to FIG. 1.

Performing steps S1 to S7 of the method determines based on the determined similarity of the actual trajectory 10 of the ego-agent 1 and the planned trajectory 8 that the ego-agent 1 executes the first planned behavior 6. The first planned behavior 6 represents the perception of the ego-agent 1 of the current situation and the presumed evolvement of the current traffic situation in the environment of the ego-agent. Based on the perceived situation as perceived by the ego-agent 1, the method of FIG. 2 performs a step S8 for determining the perceived risk model 11.

Furthermore, FIG. 2 shows the one other agent 2 driving on the right lane on a determined actually confirmed, e.g., observed trajectory corresponding to an actual behavior of the other agent. A prediction module of the assistance system may determine the actually confirmed trajectory and determine an actual behavior (other behavior) of the other vehicle 2 based thereon.

The embodiment of the method of FIG. 3 depicts a step S9 for determining whether a warning to the ego-agent 1, in particular to an operator of the ego-agent 1 or a similar action is required. Step S9 may compare the determined perceived risk model 11 with the determined actual risk model 12.

In particular, in step S9, a perceived risk value for the situation may be computed based on the determined perceived risk model 11. Step S9 further includes computing an actual risk value for the situation based on the determined actual risk model 13. Step S9 compares the computed perceived risk value and the computed actual risk value. If the comparison provides the result that the perceived risk value and the actual risk value differ, the system may conclude that an action, e.g., a warning 14 of the operator of the ego-agent 1 may be necessary.

The system may determine that the action is required in case a difference between the perceived risk value and the actual risk value exceeds a predetermined threshold value.

The determined action may include the warning. Additionally, the action may include an information of the operator of a determined perception error.

Information on the determined perception error may include highlighting a determined source of the determined perception error.

Figure 4:
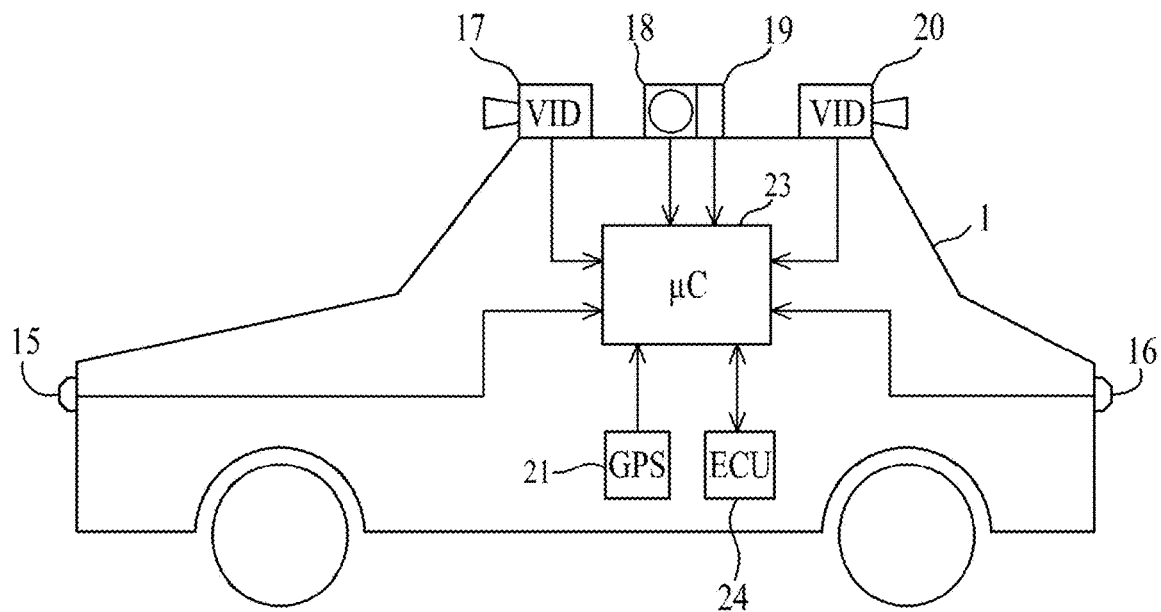
FIG. 4 provides an overview over a vehicle according to an embodiment.

FIG. 4 provides an overview over a vehicle representing an ego-agent 1 configured for applying the method according to an embodiment. The ego-agent 1 of FIG. 4 corresponds in its features to the ego-vehicle as disclosed in US 2020/231149 A1.

In particular, FIG. 4 illustrates a road vehicle as one particular embodiment of the ego-agent 1 in a side view. The ego-vehicle is equipped with the system for assisting a person as driver in operating the ego-vehicle 1. The assistance system may provide assistance by outputting information, e.g., warning signals or recommendations on actions, to the assisted persons in situations with respect to other agents, here other traffic participants, and in the form of autonomously or at least partially autonomously operating the ego-vehicle 1.

The ego-agent 1 may be any type of road vehicle including, but not limited to, cars, trucks, motorcycles, busses, and reacts to other agents 2 as other traffic participants, including but not limited to, pedestrians, bicycles, motorcycles, and automobiles.

The ego-agent 1 shown in FIG. 4 includes a plurality of sensors, including a front RADAR sensor 15, a rear RADAR sensor 16 and plural camera sensors 17, 18, 19, 20 for sensing the environment around the ego-agent 1. The plurality of sensors is mounted on a front surface of the ego-agent 1, a rear surface of the ego-agent 1, and the roof of the ego-agent 1, respectively. The camera sensors 17, . . . , 20 preferably are positioned so that a 360° surveillance area around the ego-agent 1 is possible. Thus, the ego-agent 1 is capable to monitor the environment of the ego-agent 1.

Alternatively or in addition, further sensor systems, e.g. a stereo camera system or a LIDAR sensor can be arranged on the ego-agent 1.

The ego-agent 1 further comprises a position sensor 21, e.g., a global navigation satellite system (GNSS) navigation unit, mounted on the ego-agent 1 that provides at least position data that includes a location of the ego-agent 1. The position sensor 21 may further provide orientation data that includes a spatial orientation of the ego-agent 1.

The driver assistance system of the ego-agent 1 further comprises at least one electronic control unit (ECU) 24 and a computer 23. The computer 23 may include at least one processor, e.g. a plurality of processors, microcontrollers, signal processors and peripheral equipment for the processors including memory and bus systems. The computer 23 receives or acquires the signals from the front RADAR sensor 15, the rear RADAR sensor 16, the camera sensors 17, . . . , 20, the position sensor 21, and status data of the ego-agent 1 provided by the at least one ECU 24. The status data may include data on a vehicle velocity, a steering angle, an engine torque, an engine rotational speed, a brake actuation, for the ego-agent 1, which may be provided by the at least one ECU 10.

Figure 5:
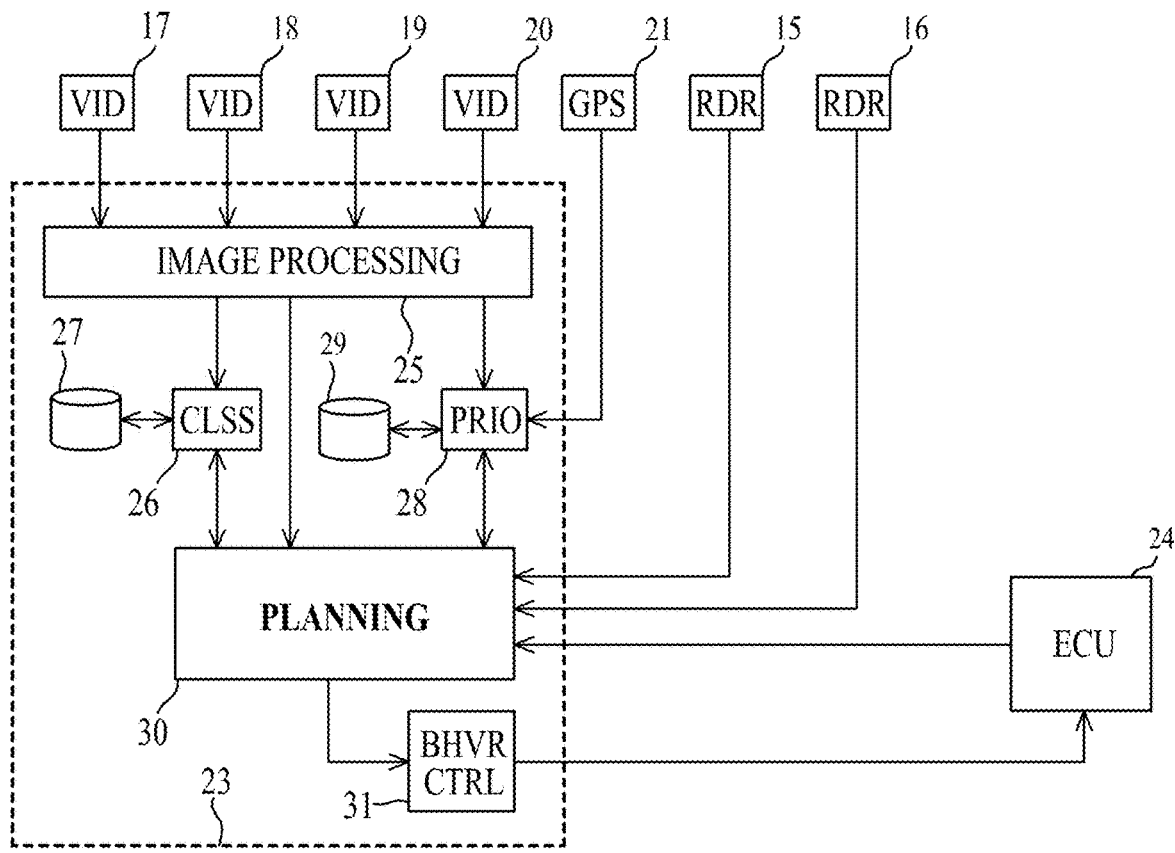
FIG. 5 shows a schematic structural diagram of a driver assistance system according to an embodiment.

FIG. 5 shows a schematic structural diagram illustrating functional elements of the computer 9 of a driver assistance system according to an embodiment. The functional description of the computer 9 of the ego-agent 1 of FIG. 5 corresponds in its features to the ego-vehicle as disclosed in US 2020/231149 A1.

An already existing computer 23 including at least one processor or signal-processor used for processing signals of an assistance system, e.g. an adaptive cruise control, of the ego-agent 1, may be configured to implement the functional components described and discussed below. The depicted computer 23 comprises an image processing module 25, an object classification module 26, an object database 27, a priority determination module 28, a map database 29, a planning module 30, and a behavior determination module 31.

Each of the modules is implemented in software that is running on the at least one processor or at least partially in dedicated hardware including electronic circuits.

The image processing module 25 receives the signals from the camera sensors 17, . . . , 20 and identifies relevant elements in the environment including but not restricted to a lane of the ego-vehicle 1 (ego lane), objects including other agents in the environment of the ego-vehicle 1, a course of the road, and traffic signs in the environment of the ego-agent 1.

The classification module 26 classifies the identified relevant elements and transmits a classification result to the planning module 30, wherein at least the technically feasible maximum velocity and acceleration of another vehicle identified by the image-processing module 25 and assessed as relevant by the planning module 30 are determined based on the object database 27.

The object database 27 stores a maximum velocity (speed) and an acceleration for each of a plurality of vehicle classes, e.g. trucks, cars, motorcycles, bicycles, pedestrians, and/or stores identification information (type, brand, model, etc.) of a plurality of existing vehicles in combination with corresponding maximum velocity and acceleration.

The priority determination module 28 individually determines a priority relationship between the ego-agent 1 and each other agent 2 (traffic participant) identified by the image-processing module 25 and involved in the current traffic situation under evaluation by the prediction module 16. The traffic situations may be classified into at least two categories by the priority determination module 28:

In a longitudinal case, the ego-agent 1 and the other agent 2 drive on the same path or lane and in a same direction, e.g., one vehicle follows the other one and a lateral case, in which, at the current point in time, the ego-agent 1 and the other agent 2 do not follow the same path, but the future paths intersect or merge within a prediction horizon of the assistance system. Thus, currently the moving directions of the ego-agent 1 and the respective other agents 2 are different. Exemplary scenarios in the road traffic environment could be road intersections, merging lanes, and more.

In a lateral case, the priority determination module 28 determines whether the ego-agent 1 has right of way over the other agent 2, or the other agent 2 has the right of way over the ego-agent 1 based on the lane, a location of the other agent 2, the course of the road, and/or the traffic signs identified by the image processing module 25. Alternatively or in addition, the priority determination module 28 performs the determination based on a position signal of the position sensor 21 and map data from the map database 29 that includes information on applicable priority rules for the road network.

The planning module 30 calculates at least one hypothetical future trajectory for the ego-agent 1 based on the status data received from the ECU 24, the information received from the image-processing module 25, the signals received from the front RADAR sensor 15 and the rear RADAR sensor 16, and, in case of the ego-agent 1 autonomously driving, information on the driving route that is defined by driving task. The calculated future trajectory indicates a sequence of future positions of the ego-agent 1.

The planning module 30 selects a prediction model for the other traffic participant depending on the priority relationship determined by the priority determination module 28. Further, the maximum velocity and acceleration may be determined by the classification module 26, wherein, when the ego-vehicle 1 and the other agent 2 follow the same path, the selected prediction model defines a constant velocity over the prediction horizon. This means that for a prediction performed based on a current situation, the other agent 2 is assumed to move further with a constant velocity for a time interval corresponding to the prediction horizon.

On the other hand, when the trajectory of the ego-agent 1 and the trajectory of the other agent 2 intersect or merge, a prediction model that defines a delayed change of velocity is selected. In particular, a delayed decrease of velocity as the delayed change of velocity is set, if the ego-agent 1 has right of way over the other agent 2. A delayed increased of velocity as the delayed change of velocity is defined in the prediction model that is selected if the other agent 2 has right of way over the ego-agent 1.

In order to determine a suitable or best behavior for the ego-agent 1, the planning module 30 may calculate a plurality of trajectories for the ego-agent 1 (ego-trajectories) and select the ego-trajectory, which results in the best behavior relevant score, as disclosed in U.S. Pat. No. 9,463, 797 B2, or iteratively change at least one of the ego-trajectory velocity profile to optimize the behavior relevant score.

The planning module 30 outputs information on the finally determined ego-trajectory (velocity profile) to the behavior determination module 31. The behavior determination module 31 determines a behavior of the ego-vehicle 1 based on the information provided by the planning module 30, generates corresponding driving control signals for executing the determined behavior by controlling at least one of acceleration, deceleration, and steering of the ego-agent 1, and outputs the generated control signals to the ECU 24.

Alternatively or in addition, the behavior determination module 31 may generate and output at least one of warning signals or information recommending actions for a person operating the ego-agent 1. The ego-agent 1 may include a human-machine interface with suitable output means including, for example, loudspeakers for an acoustic output and display screens or head-up-displays for a visual output to the operator.

The assistance system executes the described processes and steps repeatedly and parameters of the selected prediction model are adapted to changes in the environment and to behavior changes of the ego-agent 1 and other agent 2.

Figure 6:
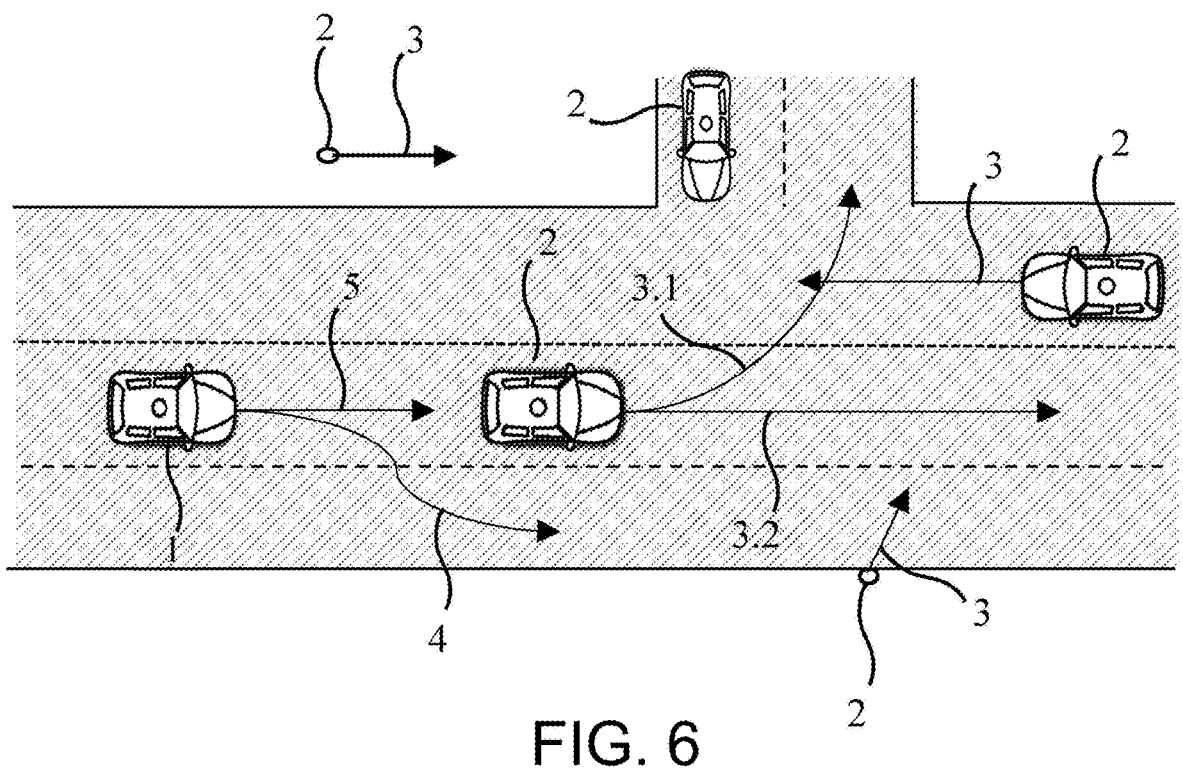
FIG. 6 illustrates a complex exemplary traffic situations including plural agents in an urban environment.

FIG. 6 illustrates a complex exemplary traffic situation including an ego-agent 1 and plural other agents 2, which is characteristic for an urban traffic environment.

The complex traffic situation depicted in FIG. 6 illustrates the resulting complexity of the objective of deciding on a proper maneuver sequence for the ego-agent 1. The proper maneuver sequence or behavior the ego-agent 1 includes selecting out of a plurality of behavior candidates, which result in respective trajectories 4, 5 of the ego-agent 1.

The traffic situation includes various sources of risk, e.g., collision risks and curvature risks. The potential ego-trajectory 4 has to take both a collision risk with the other agent 2 in the lower right of the figure and a curvature risk due to the lane change from the lane the ego-vehicle 1 is currently driving on to the right lane into account. Moreover, there exist plural behavior alternatives for the other agent immediately front of the ego-agent 1 on the same lane. A plurality of behavior alternatives result in plural predicted trajectories 3.1, 3.2 which each result in different potential outcomes and different risk models.

Furthermore, the depicted traffic situation covers a plurality of regulatory items, e.g. the right of way at an intersection of a two roads, which includes apparently no traffic lights or signs. Thus, the regulatory items including traffic lights, the road signs, and the applicable traffic rules all heavily influence the traffic situation to be assessed and resolved by the assistance system. This applies in particular to the dense urban traffic environment that typically includes a plurality of agents, a variety of regulatory items and a plurality of risk sources as relevant elements at the same time. Further challenges in finding a behavior for the ego-agent 1 exist due to the evolvement of the traffic situation, which is particularly rapid in the urban environment, contrary to the slower scene evolvement encountered on overland routes, for example. The evolvement of the traffic situation requires a constant update of situation-aware planning and benefits in particular from the advantages introduced by taking the perceived risk from the perspective of the ego-agent 1 into account.

Figure 7:
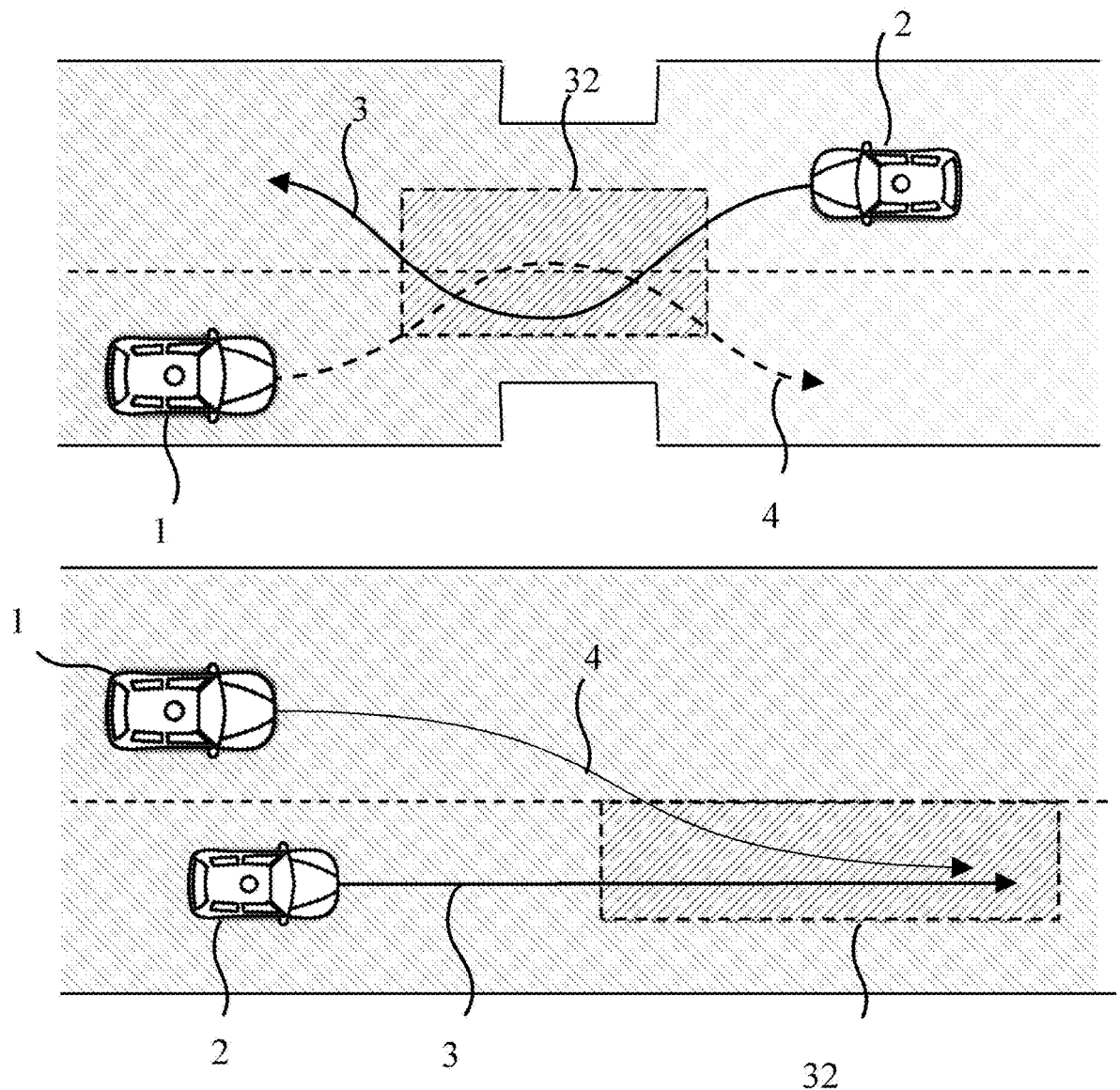
FIG. 7 illustrates further exemplary traffic situations including plural agents.

FIG. 7 illustrates two further exemplary traffic situations including plural agents.

While FIG. 6 shows a traffic situation, which illustrates the objective of finding a behavior for the ego-agent 1 to cope with the scenario posed by a complex traffic situation, the traffic situations of FIG. 7 show the challenge posed by ordering problems. The upper and the lower portion of FIG. 7 show respectively a road traffic scenario, in which the predicted behaviors of the ego-agent 1 and the other agent 2 result in respective predicted trajectories 3, 4, which result in a risk model that has a significant collision risk in an area 32 in the environment. In both cases, judging the perceived risk by the ego-agent 1 may prove advantageous in order to resolve the current situation, in which traffic rules fail in unambiguously supporting a solution to the ordering problem inherent in the traffic situations.

The method for determining a perceived risk model is, in particular, suitable to support planning problems for finding suitable behavior alternatives for mid-term planning problems and long-term planning problems. Mid-term planning problems are characterized by gradual changes of speed and lateral positions, solving the issue how to proceed. Long-term planning problems concern deciding the different outcomes of the "you or me first?" problem, solving the issue what to do.

Figure 8:
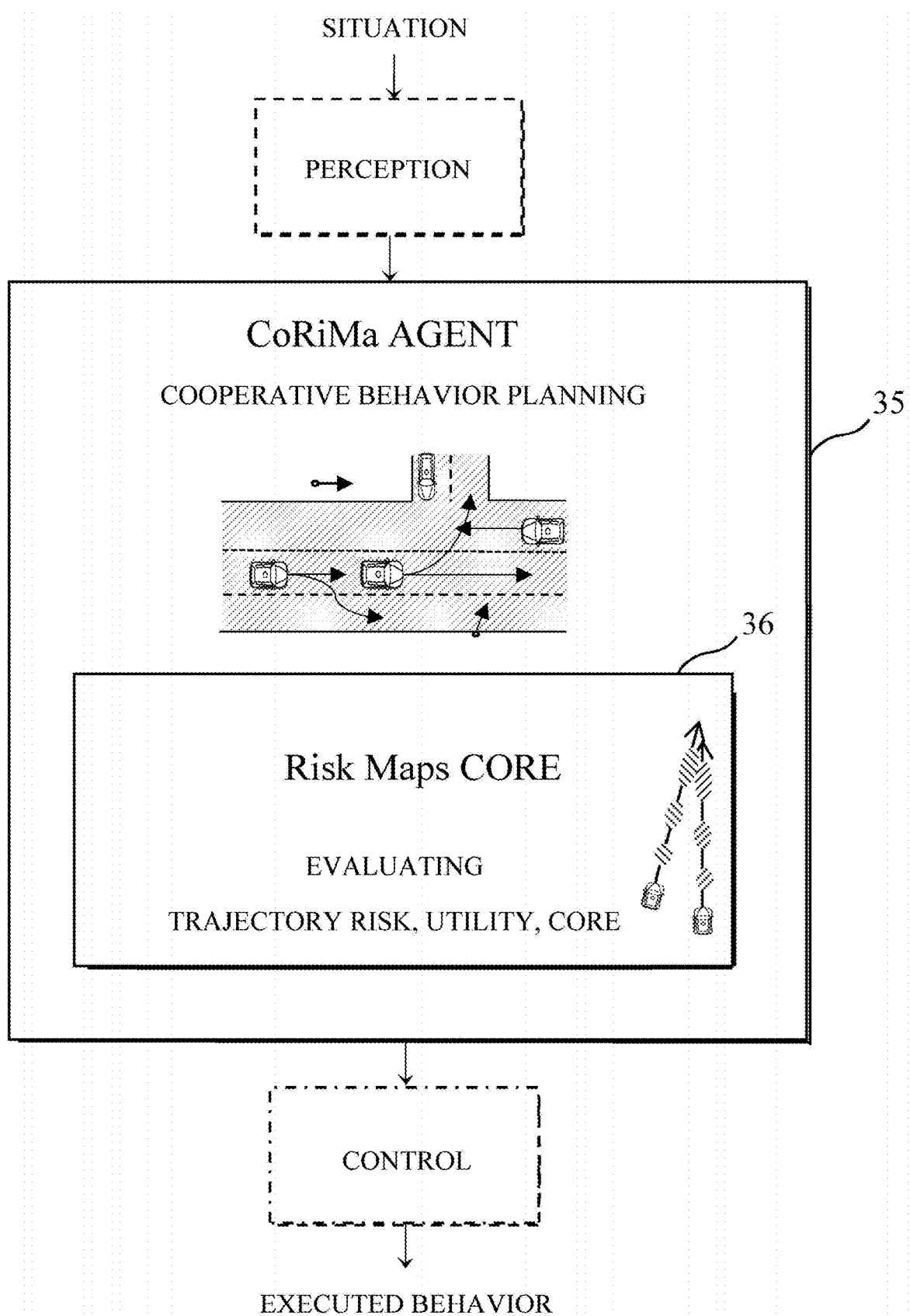
FIG. 8 illustrates a simplified processing flow for planning a complex behavior of the ego-agent 1 to cope with a complex situation in the environment.

FIG. 8 illustrates a simplified processing flow for planning a complex behavior of the ego-agent 1 to cope with a complex situation in the environment.

The simplified processing flow illustrates in particular the processing for planning a behavior that uses a representation of the perceived situation in the environment of the ego-agent 1 input to a cooperative behavior-planning module 35 (CoRiMa agent). The cooperative behavior-planning module 35 performs behavior planning based on a representation of the perceived environment including the ego-agent 1 and the at least one other agent 2. In particular, the cooperative behavior-planning module 35 is a computer-implemented system that generates appropriate behavior options for the ego-agent to address the perceived situation for further evaluation. The cooperative behavior-planning module 35 generates appropriate trajectories for a comprehensive environment representation. The cooperative behavior-planning module 35 provides generalizable concepts for an efficient analysis. The cooperative behavior-planning module 35 performs a selection from the behavior options and predicted trajectories.

For evaluating trajectories, the cooperative behavior-planning module 35 may rely on a risk-mapping module 36 (risk maps core). The risk-mapping module 36 assigns a value to trajectories input to the risk-mapping module 36 based on an evaluation of at least one of a trajectory risk, e.g. a collision risk, a utility of the trajectory, and a comfort of the trajectory when performed. The risk-mapping module 36 thereby provides an evaluation of a behavior corresponding to the evaluated trajectory. The proposed method of determining a perceived risk model using the behavior-planning module 35 and the risk-mapping module 36 may be integrated into an analytic, interpretable, generalizable and holistic approach of analyzing the behavior alternatives and predicted trajectories benefitting from proven advantages or a risk analysis based on risk maps over existing other evaluation methods for trajectories and for behavior planning.

The cooperative behavior-planning module 35 and the risk-mapping module 36 may form part of an implementation of the planning module 30 and the behavior determination module 31 of the computer 23 of the ego-agent 1.

The cooperative behavior-planning module 35 determines a selected behavior and appropriate trajectory for the ego-agent 1 in the current situation. The behavior determination module 31 may generate corresponding driving control signals for executing the determined behavior by controlling at least one of acceleration, deceleration, and steering of the ego-agent 1, and outputs the generated control signals to the ECU 24 of the ego-agent 1 in order to execute the determined behavior.

Figure 9:
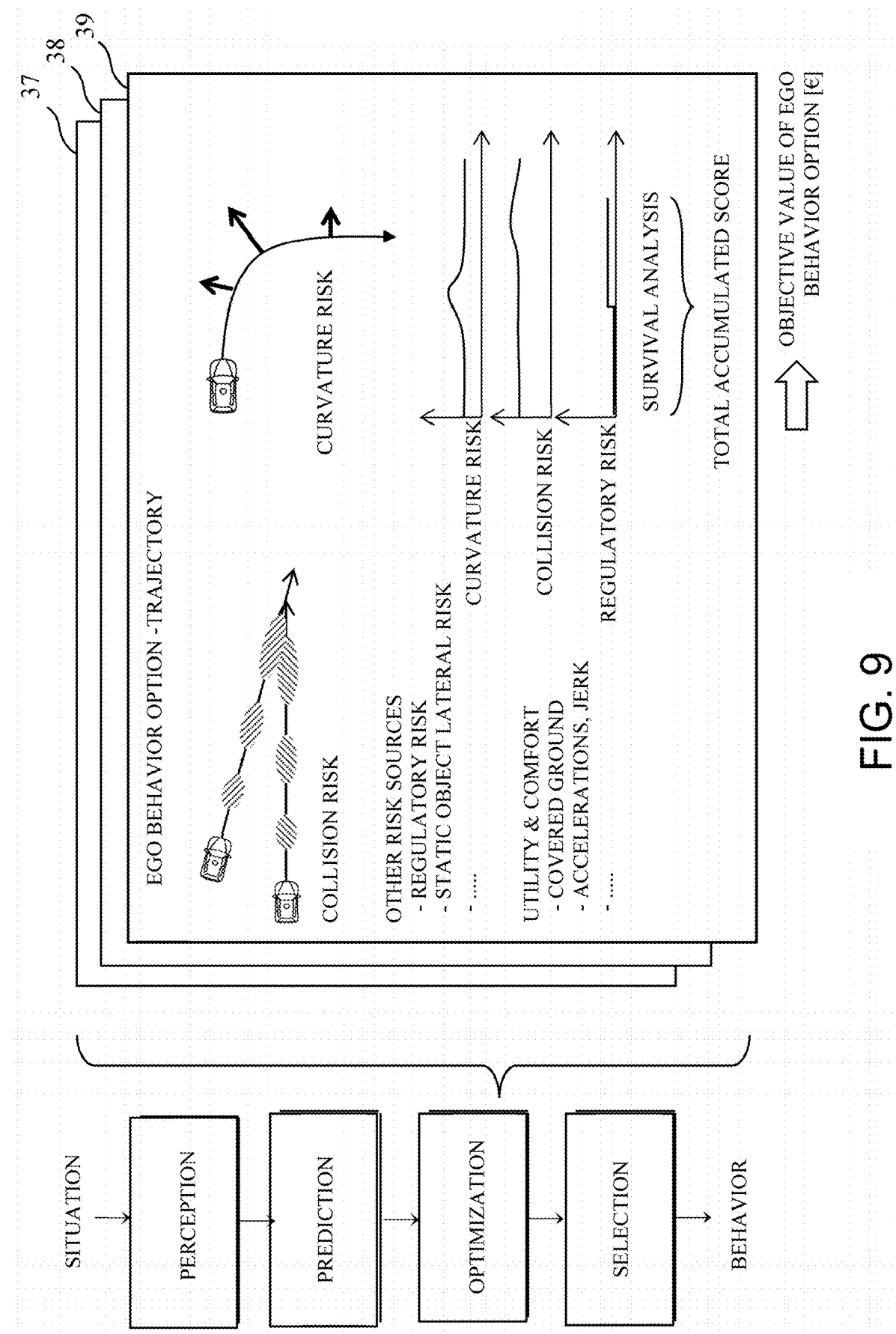
FIG. 9 illustrates a more detailed processing flow for planning a complex behavior for the ego-agent 1 to cope with a complex situation in the environment.

FIG. 9 illustrates an example of a plurality of behavior options for the ego-agent 1 in a behavior planning system based on an implementation of the cooperative behavior-planning module 35 and the risk-mapping module 36 according to FIG. 8.

Perceiving the environment to generate the representation and predicting behavior alternatives for the current situation in the environment of the ego-vehicle 1 provides a plurality of behavior options 37, 38, 39 (ego-behavior options) for evaluation in the risk-mapping module 36.

Each behavior option 37, 38, 39 corresponds to a trajectory of the ego-agent 1, which is analyzed with respect to an associated risk including a plurality of specific risk types of which some are discussed in more detail.

Analyzing the collision risk of the ego-agent 1 with one other agent 2 of plural other agents 2 may include computing a collision probability of that is proportional to a product of two Gaussian distributions and a modelled severity of the collision between the ego-agent 1 and the other agent 2 involved in the collision.

Other types of risks taken into account may include regulatory risk, e.g. speed limits, or a static object lateral risk.

Further aspects of each behavior option 37, 38, 39, which may be taken into account include at least one of a utility and the comfort of the behavior option 37, 38, 39. The utility and the comfort of the behavior option 37, 38, 39 may be determined by assessing a covered ground by the ego-agent 1 while moving along the trajectory of the behavior option 37, 38, 39. Alternatively or additionally, the utility and the comfort of the behavior option 37, 38, 39 may be computed based on an acceleration, which is exerted on the ego-agent 1 while moving along the trajectory of the behavior option 37, 38, 39. Alternatively or additionally, the utility and the comfort of the behavior option 37, 38, 39 may be computed based on a jerk, which is exerted on the ego-agent 1 while moving along the trajectory of the behavior option 37, 38, 39.

Based on the analysis, the risk-mapping module 36 assigns an objective value to each ego-behavior option 37, 38, 39. The objective value may be determined based on a total accumulated score computed by a survival analysis. FIG. 9 illustrates three exemplary types of risks contributing to the total accumulated score, the curvature risk, the collision risk, and the regulatory risk.

The ego-behavior options 37, 38, 39 are optimized based on a cost function corresponding to the objective value of each ego-behavior option 37, 38, 39.

The optimized ego-behavior options 37, 38, 39 are provided to a subsequent selecting step, which selects the most suitable optimized ego-behavior options 37, 38, 39. The selection may be a conditional selection, e.g. the selected ego-behavior options 37, 38, 39 is selected under the prerequisite that the predetermined event in the perceived situation is determined to occur. In case of a the conditional selection a most suitable optimized ego-behavior options 37, 38, 39 may be selected and at least one fallback optimized ego-behavior options 37, 38, 39 that works in the perceived situation is also selected and executed in case that the predetermined event is determined to occur.

Finally the selected ego-behavior 37, 38, 39 is output for execution to the ECU 24.

The described embodiments show how the method for an assistance system may be applied to an intersection scenario and a lane change scenario. However, the assistance system may apply the method to further driving situations in a road traffic environment.

Moreover, the method may prove an advantageous addition to an assistance system that supports control of vehicles with an improved capability to handle an obstructed sensor coverage, using a risk measure for a collision between a virtual traffic entity and the ego-agent 1 as discussed in U.S. Pat. No. 10,627,812 B2 in detail.

Alternatively, the method may prove an advantageous addition to an assistance system that supports control of other types of vehicles than road vehicles, e.g. spacecraft, vessels or planes.

Alternatively, the ego-agent may be a pedestrian carrying a portable device that includes a human-machine interface for communicating with the pedestrian. The portable device includes an embodiment of the assistance system and is adapted to assist the user by outputting a perceivable signal via the human-machine interface to the user based on the generated control signal. The perceivable signal may include at least one of a visual signal, an audible signal or a tactile signal, which, e.g., issue a warning to the pedestrian user in case a misinterpretation of a current situation in the environment is determined.

Determining a perceived risk from the perspective of the ego-agent 1 is also an advantageous addition to an assistance system that has a capability to autonomously, or at least partially autonomously operate an ego-agent 1 in the environment.

All steps which are performed by the various entities described in the present disclosure as well as the functionalities described to be performed by the various entities are intended to mean that the respective entity is adapted to or configured to perform the respective steps and functionalities. In the claims as well as in the description the word "comprising" does not exclude the presence of other elements or steps.

The indefinite article "a" or "an" does not exclude a plurality. A single element or other unit may fulfill the functions of several entities or items recited in the claims. The mere fact that different dependent claims recite certain measures and features of the converter circuit does not exclude that a combination of these measures and features cannot be combined in an advantageous implementation.

What is claimed is:

1. A computer-implemented method in an assistance system for determining a perceived situation perceived by an ego-agent, comprising:
    sensing an environment of the ego-agent that includes at least one other agent;
    predicting possible behaviors of the at least one other agent based on the sensed environment;
    planning trajectories of the ego-agent for each possible behavior of the at least one other agent to generate a set of planned trajectories;
    determining an actual trajectory of the ego-agent;
    comparing the determined actual trajectory of the ego-agent with a plurality of the planned trajectories of the ego-agent, and determining a planned trajectory with a largest similarity to the actual trajectory of the ego-agent;
    determining a perceived situation as perceived by the ego-agent based on a particular predicted possible behavior of the predicted possible behaviors corresponding to the planned trajectory with the largest similarity; and
    executing an action in the assistance system based on the determined perceived situation.

2. The method according to claim 1, wherein, in the step of planning the trajectories, the method comprises
    planning the trajectories of the ego-agent for each combination of a behavior of the ego-agent with each of the behaviors of the at least one other agent.

3. The method according to claim 1, wherein
    a risk value used in the step of planning the trajectories, corresponding to the planned trajectory with the highest similarity to the actual trajectory is a perceived risk value.

4. The method according to claim 1, wherein,
    in the step of planning the trajectories, the method comprises
    planning the trajectories, by a path prediction module, based on a process for kinematic expansion.

5. The method according to claim 1, wherein,
    in the step of predicting the possible behaviors of the at least one other agent, the method comprises
    predicting the trajectories, by a prediction model of the assistance system, by approximating a perceived behavior of the at least one other agent based on the sensed environment.

6. The method according to claim 1, wherein,
    in the step of planning the trajectories of the ego-agent, the method comprises
    planning, by a planning model of the assistance system, to determine for each possible behavior of the at least one other agent, an optimal plan for the ego-agent,
    wherein the optimal plan is optimized with respect to at least one of the criteria of a safe plan, an efficient plan and a comfortable plan, and
    planning the trajectories of the ego-agent based on the determined optimal plan.

7. The method according to claim 1, wherein
    the assistance system is a road traffic driving assistance system that includes at least one of a lane change assistant, a cruise control system, an intersection assistant.

8. The method according to claim 1, wherein the method further comprises:
    determining a perceived risk value based on the perceived situation, and
    determining a risk perception error of the ego-agent based on a difference between the perceived behavior of the at least one other agent and an actual behavior of the at least one other agent.

9. The method according to claim 8, wherein the method further comprises:
    determining whether to generate a warning signal configured to warn on the determined risk perception error and outputting the generated warning signal to the assistance system.

10. The method according to claim 9, wherein the method determines to generate and output the warning signal in case of a difference between the perceived risk and the actual risk exceeding a threshold.

11. The method according to claim 9, wherein the method outputs the warning signal including an indication of the risk perception error to an operator of the ego-agent.

12. The method according to claim 8, wherein
    the risk perception error includes at least one of a trajectory prediction error, a dynamics estimation error, and an entity perception error.

13. A non-transitory computer-readable storage medium embodying a program of machine-readable instructions executable by a digital processing apparatus, which cause the digital processing apparatus to perform operations according to claim 1.

14. A system for determining a perceived situation perceived by an ego-agent in an assistance system, the system comprising:

sensors configured to sense an environment of the ego-agent that includes at least one other agent; and a processor configured to predict possible behaviors of the at least one other agent based on the sensed environment, to plan trajectories of the ego-agent for each possible behavior of the at least one other agent to generate a set of planned trajectories, to determine an actual trajectory of the ego-agent, to compare the determined actual trajectory of the ego-agent with each of the planned trajectories of the ego-agent and determining a planned trajectory with a largest similarity to the actual trajectory of the ego-agent, and to determine a perceived situation as perceived by the ego-agent based on a particular predicted possible behavior of the predicted possible behaviors corresponding to the planned trajectory with the largest similarity;

generating and outputting a control signal based on the determined perceived situation to the assistance system for controlling at least one actuator or a human-machine interface configured to execute an action based on the determined perceived situation.

15. The system according to claim 14, wherein the assistance system is configured to assist an operator of the ego-agent.

16. The system according to claim 14, wherein the assistance system is included in a portable device including a human-machine interface and carried by a user, and the assistance system is configured to assist the user by outputting a perceivable signal via the human-machine interface to the user based on the generated control signal.

17. A vehicle including an assistance system according to claim 14.

18. The vehicle according to claim 17, wherein the vehicle is at least one of a road vehicle, a maritime vehicle, an air vehicle, a space vehicle, an autonomously operating vehicle, and a micromobility vehicle.

\* \* \* \* \*